(12) United States Patent
Williford et al.

(10) Patent No.: US 10,748,310 B2
(45) Date of Patent: Aug. 18, 2020

(54) DRAWING TUTORIAL APPLICATION UTILIZING IMAGE PROCESSING

(71) Applicant: Microsoft Technology Licensing, LLC, Redmond, WA (US)

(72) Inventors: Blake Emory Williford, Bryan, TX (US); Claes-Fredrik Urban Mannby, Mercer Island, WA (US); Abhay Tanaji Doke, Bellevue, WA (US); Biyi Fang, Lansing, MI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 16/129,266

(22) Filed: Sep. 12, 2018

(65) Prior Publication Data

US 2020/0082583 A1    Mar. 12, 2020

(51) Int. Cl.
| | |
|---|---|
| *G06T 11/20* | (2006.01) |
| *G06T 7/13* | (2017.01) |
| *G06K 9/62* | (2006.01) |
| *G06T 7/507* | (2017.01) |
| *G06T 7/543* | (2017.01) |

(52) U.S. Cl.
CPC .......... *G06T 11/203* (2013.01); *G06K 9/6223* (2013.01); *G06T 7/13* (2017.01); *G06T 7/507* (2017.01); *G06T 7/543* (2017.01); *G06T 2200/24* (2013.01)

(58) Field of Classification Search
CPC ....................................................... G06T 7/13
USPC ....................................................... 345/441
See application file for complete search history.

(56) References Cited

U.S. PATENT DOCUMENTS

| | | | |
|---|---|---|---|
| 2009/0253107 A1 | 10/2009 | Marggraff | |
| 2014/0289663 A1 | 9/2014 | Zhang et al. | |
| 2016/0261793 A1* | 9/2016 | Sivan | .................. H04N 19/597 |
| 2017/0192651 A1* | 7/2017 | Yang | .................. G06F 3/04845 |

OTHER PUBLICATIONS

"PortraitSketch: face sketching assistance for novices" Jun Xie, Aaron Hertzmann, Wilmot Li, and Holger Winnemöller October year 2014 UIST '14: Proceedings of the 27th annual ACM symposium on User interface software and technology.*

(Continued)

*Primary Examiner* — Javid A Amini
(74) *Attorney, Agent, or Firm* — Rainier Patents, P.S.

(57) ABSTRACT

Described herein is a system and method regarding an interactive drawing tutorial session for creating a drawing using a computer application. A digital image is processed to determine linework and shading information for a plurality of shading levels. A graphical user interface for an interactive drawing tutorial session for creating the drawing by displaying the determined linework to a user. User linework input is received for the drawing based upon the displayed linework information. Feedback is provided to the user regarding the received user linework input (e.g., regarding tilt and/or pressure of electronic stylus). For each of the plurality of shading levels, the determined shading information is displayed to the user. User shading input is received for the drawing based upon the displayed shading information. Feedback is provided to the user regarding the received user shading input (e.g., regarding tilt and/or pressure of electronic stylus).

20 Claims, 17 Drawing Sheets

(56) References Cited

OTHER PUBLICATIONS

Yamamoto, et al., "Drawing Learning Support System with the Past Brilliant Learner-self using Visual and Auditory Feedback", In Proceeding of IEEE 2nd VR Workshop on Sonic Interactions for Virtual Environments (SIVE), Mar. 24, 2015, 2 Pages.
"International Search Report and Written Opinion Issued in PCT Application No. PCT/US2019/039648", dated Oct. 15, 2019, 16 Pages.
Williford, et al., "DrawMyPhoto: Assisting Novices in Drawing from Photographs", In Proceedings of the 2019 on Creativity and Cognition, Jun. 23, 2019, pp. 198-209.
Xie, et al., "PortraitSketch: Face Sketching Assistance for Novices", In Proceedings of the 27th Annual ACM Symposium on User Interface Software and Technology, Oct. 5, 2014, pp. 407-417.
"Free Bob Ross App!", retrieved from "https://www.bobross.com/Articles.asp?ID=366" on Sep. 15, 2018, 1 page.
"Portrait Sketch", retrieved from "https://play.google.com/store/apps/details?id=com.dumplingsandwich.portraitsketch&hl=en_US/" on Sep. 15, 2018, 3 pages.
"ShadowDraw", retrieved from "https://www.shadowdrawapp.com/" on Sep. 15, 2018, 6 pages.
Colbran, Stephen, "iCanDraw", retrieved from "https://appadvice.com/app/icandraw/326095923" on Sep. 15, 2018, 4 pages.
Iarussi, Emmanuel, et al., "The Drawing Assistant: Automated Drawing Guidance and Feedback from Photographs", ACM, 2013, 10 pages.

\* cited by examiner

FROM FIG. 17

DRAWING TUTORIAL APPLICATION UTILIZING IMAGE PROCESSING

BACKGROUND

Photographs, whether based on traditional film/print or digital media, have become commonplace. Conventional computer applications use image processing to give photos a "sketched" or rendered look.

SUMMARY

Described herein is a system for creating a drawing, comprising: a computer comprising a processor and a memory having computer-executable instructions stored thereupon which, when executed by the processor, cause the computer to: receive a digital image; process the digital image to determine linework and shading information for a plurality of shading levels; provide a graphical user interface for an interactive drawing tutorial session for creating the drawing, comprising: display the determined linework to a user, receive user linework input for the drawing based upon the displayed linework information, and provide feedback to the user regarding the received user linework input; for each of the plurality of shading levels, display the determined shading information to the user, receive user shading input for the drawing based upon the displayed shading information, and provide feedback to the user regarding the received user shading input; and store the drawing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
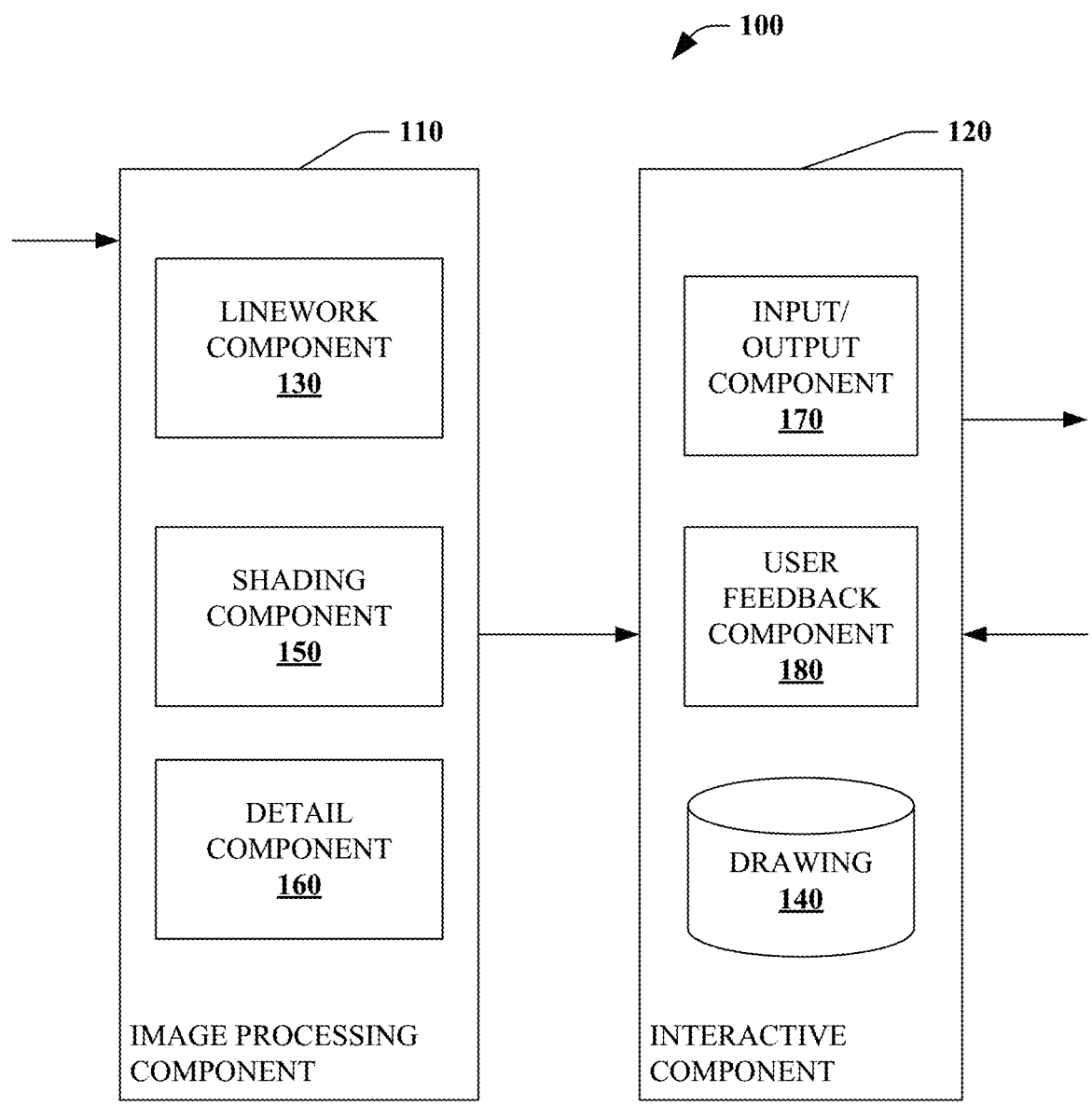
FIG. 1 is a functional block diagram that illustrates a system for creating a drawing.

Various technologies pertaining to providing a drawing tutorial application utilizing image processing are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding a drawing tutorial application utilizing image processing. What follows are one or more exemplary systems and methods.

Aspects of the subject disclosure pertain to the technical problem of processing a digital image to facilitate an interactive drawing tutorial session. The technical features associated with addressing this problem involve receiving a digital image; processing the digital image to determine linework and shading information for a plurality of shading levels; and providing a graphical user interface for an interactive drawing tutorial session for creating the drawing, comprising: displaying the determined linework to a user, receiving user linework input for the drawing based upon the displayed linework information, and providing feedback to the user regarding the received user linework input; for each of the plurality of shading levels, displaying the determined shading information to the user, receiving user shading input for the drawing based upon the displayed shading information, and providing feedback to the user regarding the received user shading input; and storing the drawing. Accordingly, aspects of these technical features exhibit technical effects of more efficiently and effectively processing a digital image to facilitate an interactive drawing tutorial session resulting in reduced consumption of computer resources such as processor and/or memory utilization.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Conventional applications have allowed user to utilize image processing to give photos a "sketched" or rendered look. These conventional applications do not typically provide instruction on how to draw an image corresponding to the photos.

Described herein is a system and method for converting a digital image (e.g., photo) into a set of steps that interactively guide a user in drawing the digital image, for example, in a way that approaches how professional artists draw. The system and method can provide real-time feedback as a user creates a drawing of the digital image.

The system and method can utilize image processing to produce a linework step, a plurality of shading steps, and, optionally, a final details step from the original image (e.g., photograph). In some embodiments, intelligent real-time feedback on pressure, tilt, and/or grip suggestions to guide the user can also be provided. Optionally, a grid can be provided to guide the user and/or an underlay feature can be provided which can assist novice(s) who prefer to trace instead of draw freehand.

Referring to FIG. 1, a system for creating a drawing 100 is illustrated. The system 100 includes an image processing component 110 and an interactive component 120. In some embodiments, the system 100 processes image(s), produces guidance images from the processed image, and provides interaction with a user beginning linework (e.g., to allow for proper proportion and alignment of the drawing, as well as composition). The user is then interactively guided to feather-in value(s), beginning from light values and working towards darker values as the user fills-in the details of the drawing.

The image processing component 110 processes a digital image (e.g., file) to determine linework, shading information for a plurality of shading levels, and, optionally, detail information. The interactive component 120 provides a graphical user interface for an interactive drawing tutorial session with a user for creating the drawing.

For purposes of explanation and not limitation, conversion of digital image(s) to grayscale by the image processing component 110 is discussed herein. In some embodiments, the image processing component 110 processes a non-grayscale (e.g., color) digital image to identify linework, shading information for a plurality of shading levels, and, optionally, detail information.

Figure 2:
FIG. 2 is a diagram that illustrates an exemplary digital image converted to grayscale.

In some embodiments, the image processing component 110 initially converts the digital image to grayscale and then applies a saturation effect which pushes white values forward in order to avoid a scenario in which substantially the entire image comprises shades of gray. An image comprised entirely of shades of gray can lead to poor quality drawings. In some embodiments, one or more filters can be applied to the converted image, for example, to remove blurriness, fuzziness and/or other portion(s) of the image which may be distracting to the user during creation of the drawing using the interactive component 120. In some embodiments, for example, based upon a user-configured setting and/or pre-defined setting, the image processing component 110 can utilize segmentation algorithm(s) to remove background(s). In some embodiments, for example, based upon a user-configured setting and/or predefined setting, the image processing component 110 can utilize algorithm(s) to create different texture(s) such as crosshatching. Referring to FIG. 2 with continued reference to FIG. 1, an exemplary digital image 200 converted to grayscale is illustrated.

Figure 3:
FIG. 3 is a diagram that illustrates an exemplary linework guidance image.

A linework component 130 of the image processing component 110 determines linework of the digital image (e.g., once the digital image has been converted to grayscale and the saturation effect applied), for example, using an edge detection technique to identify sharp intensity transitions of pixel values within the converted digital image (e.g., absolute value of pixel change over predefined quantity of pixels). In some embodiments, the linework component 130 can utilize Canny edge detection to identify linework of the digital image. The linework component 130 can produce a guidance image to be used as a template for the linework of a drawing 140 to be generated by the user utilizing the interactive component 120. Referring to FIG. 3 with continued reference to FIG. 1, an exemplary linework guidance image 300 is illustrated.

The image processing component 110 can further include a shading component 150 that identifies shading information for a plurality of shading levels. In some embodiments, a quantity of shading levels is user-configurable (e.g., in a range of three to ten). In some embodiments, the quantity of shading levels is pre-defined (e.g., three levels corresponding to light, medium and dark).

In some embodiments, the quantity of shading levels is pre-defined based upon user selection of drawing ability (e.g., beginner, intermediate, advanced). For example, for a drawing ability of beginner, the quantity of shading levels can be basic (e.g., three). For a drawing ability of intermediate, the quantity of shading levels can be more complex (e.g., six). For a drawing ability of advanced, the quantity of shading levels can be even more complex (e.g., twelve).

Based upon a quantity of shading levels, the shading component 150 identifies shading information for each of the plurality of shading levels. In some embodiments, the shading component 150 utilizes k-means clustering to identify a quantity of clusters based on values. For example, the quantity of clusters can be the quantity of shading levels plus one which corresponds to the value "white". In some embodiments, the shading component 150 disregards the cluster corresponding to the value "white".

In some embodiments, the shading component 150 identifies shading information for four clusters (e.g., three shading levels and white). The shading component 150 discards the cluster corresponding to white with the remaining clusters corresponding to light, medium, and dark gray value regions of the digital image. These can correspond to the light, medium and dark shading steps, respectively.

Figure 4:
FIGS. 4-6 are diagrams that illustrate exemplary shading guidance images.
Figure 5:
Figure 6:

Referring to FIGS. 4-6 with continued reference to FIG. 1, exemplary shading guidance images 400, 500, 600 are illustrated. The shading guidance images 400, 500, 600, correspond to light, medium and dark shading steps, respectively.

In some embodiments, the shading information provided by the shading component 150 includes a particular color associated with the region. The shading levels can correspond to distinct colors, for example, based upon user-selectable and/or pre-defined colors. In this manner, identification of shading information can be performed based upon values associated with these distinct colors.

Figure 7:
FIG. 7 is a diagram that illustrates an exemplary detail guidance image.

The image processing component 110 can optionally include a detail component 160. The detail step can include combined shading regions such that the user can fill in any detail(s) the user may have missed as the user was shading in the individual steps (e.g., linework and/or shading levels). Turning to FIG. 7 with continued reference to FIG. 1, an exemplary detail guidance image 700 is illustrated.

Information regarding the processed digital image can be provided to the interactive component 120 which provides a graphical user interface for an interactive drawing tutorial session with the user for creating the drawing 140. The interactive component can include an input/output component 170 and a user feedback component 180.

The input/output component 170 can display the determined linework to the user. The input/output component 170 can further receive user linework input for the drawing based upon the displayed linework information. The user feedback component 180 can provide feedback (e.g., display) to the user regarding the received user linework input.

The input/output component 170 can, for each of the plurality of shading levels, display the determined shading information for the particular shading. The input/output component 170 can further receive user shading input for the drawing based upon the displayed shading information. The user feedback component 180 can provide (e.g., display) feedback to the user regarding the received user shading input.

Optionally, the input/output component 170 can display the determined detail information and receive user detail input for the drawing based upon the displayed detail information. Optionally, the feedback component 180 can provide feedback to the user regarding the received detail user input.

Figure 8:
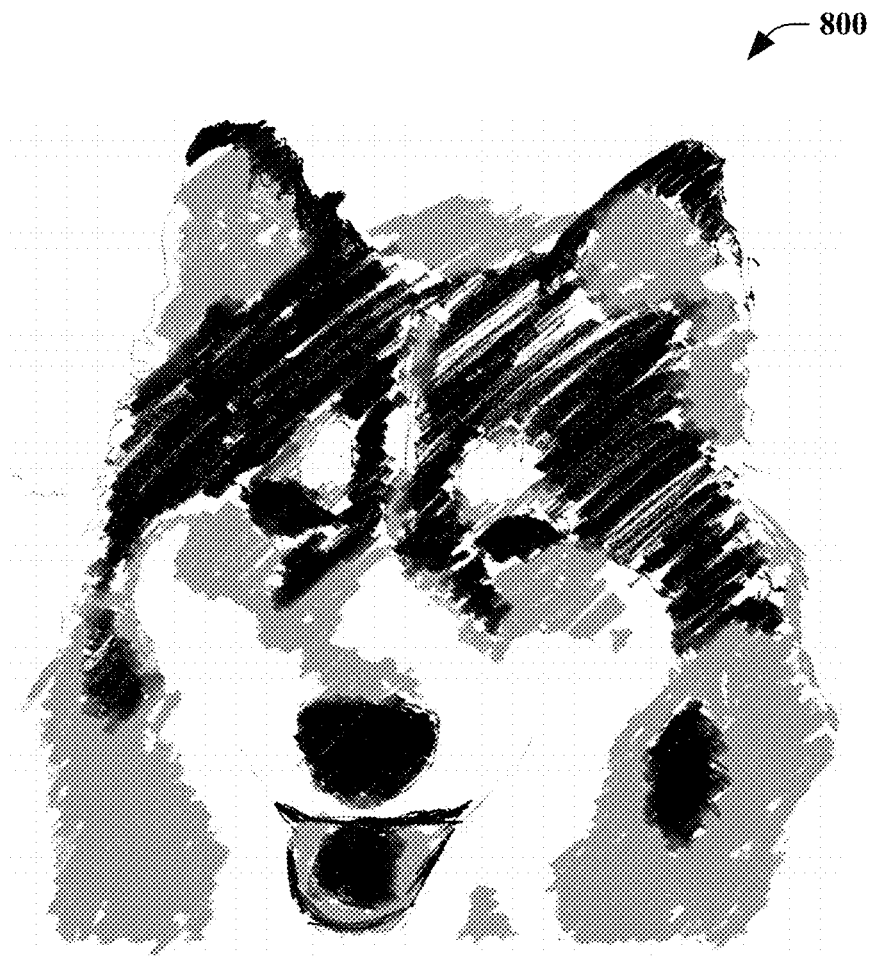
FIG. 8 is a diagram that illustrates an exemplary drawing.

In some embodiments, the interactive component 120 sequentially provides a linework step, a plurality of shading steps, and, optionally, a final details step, to guide the user in creating the drawing 140 based upon the digital image. In some embodiments, the interactive component 120 allows for the user to utilize all or some of these steps out of sequence (e.g., using displayed controls to navigate to a previous step or advance to a next step). During the drawing process and/or upon completion of the drawing 140, the drawing 140 can be stored. Turning briefly to FIG. 8, a graphical user interface of an exemplary drawing 800 is illustrated.

Figure 9:
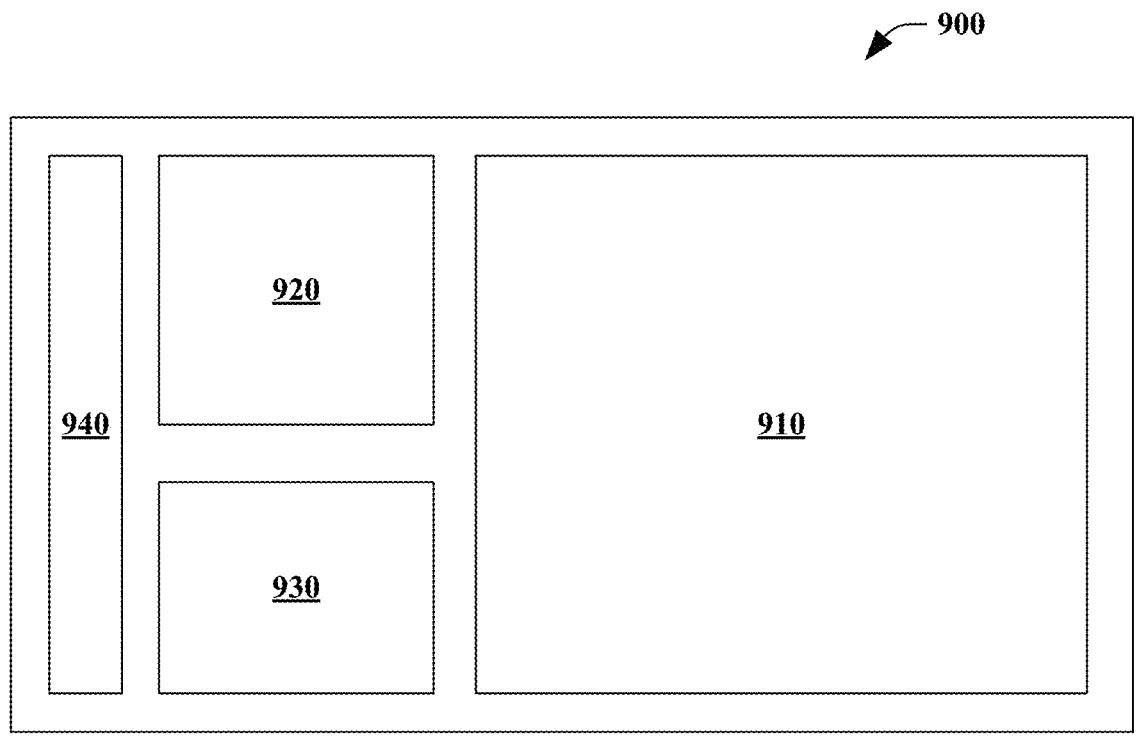
FIGS. 9-15 are diagrams that illustrates exemplary graphical user interfaces.

Referring to FIG. 9, an exemplary graphical user interface 900 is illustrated. The user interface 900 can be provided by the system 100. The user interface 900 includes a drawing canvas area 910, a guidance image area 920, a guidance information area 930, and/or a toolbar area 940.

The drawing canvas area 910 is the portion of the graphical user interface 900 in which the user creates the drawing 140. In some embodiments, the system 100 can be user-selectable to support both right-handed and left-handed users by adjusting the drawing canvas area 910 of the user interface 900 to be on the side of the dominant hand.

Figure 10:
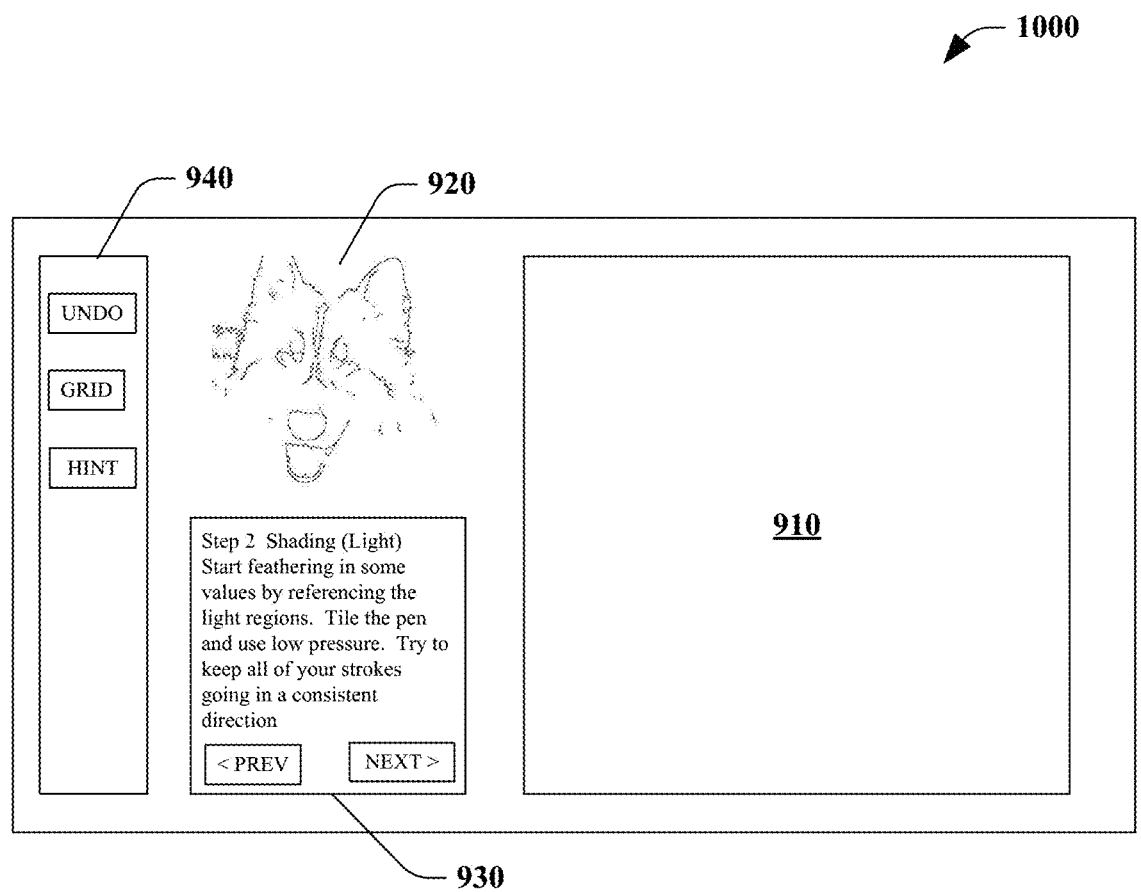

Referring to FIG. 10, an exemplary user interface 1000 is provided. In some embodiments, the user can in drawing canvas area 910 based upon a particular guidance image generated by the image processing component 100 and displayed in the guidance image area 920. In the exemplary user interface 1000, the drawing canvas area 910 is initially blank until the user begins to draw.

Figure 11:
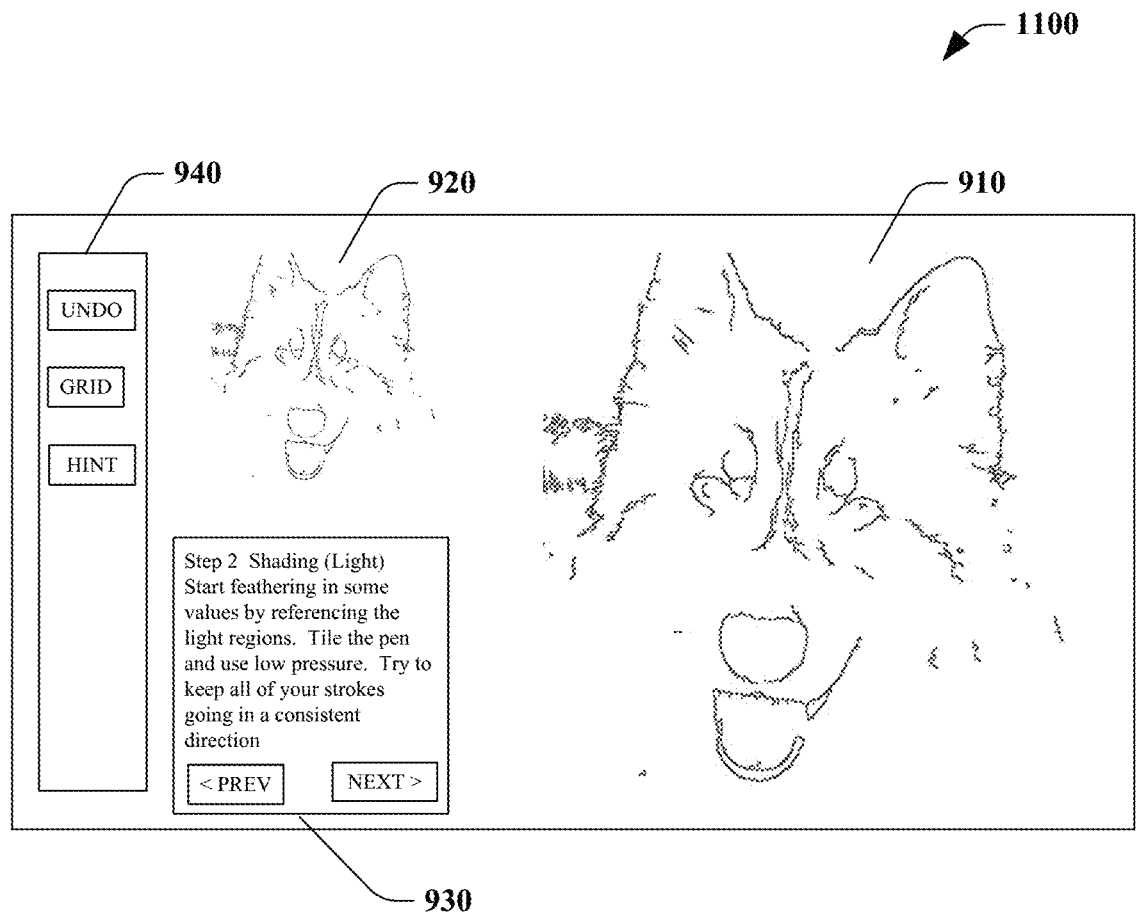

Turning briefly to FIG. 11, an exemplary user interface 1100 is provided. In some embodiments, the user can draw in the drawing canvas area 910 while the particular guidance image is simultaneously displayed within at least a portion of the drawing canvas area 910 (e.g., the particular guidance image is an underlay within the drawing canvas area 910). For example, the particular guidance image can be simultaneously displayed as an underlay in a particular color (e.g., user configurable and/or predefined).

In some embodiments, the guidance image underlays mirror the guidance image(s) but are rendered in a light blue color so that the user can see a difference between where they have drawn and where they need to draw. Displaying the guidance image underlays in a different color allows the user to visually distinguish between the particular guidance image and the drawing 140 the user is creating within the drawing canvas area 910. In some embodiments, the user can select whether or not guidance images are displayed in the drawing canvas area 910.

The guidance image area 920 displays a particular one of the guidance images generated by the image processing component (e.g., linework, shading levels and/or details) corresponding to a current step. In some embodiments, the particular guidance image is continuously displayed in the guidance image area 920. The guidance information area 930 can provide information regarding a particular step in which the user is currently engaged along with instructions for that particular step of creating the drawing 140.

The toolbar area 940 can include one or more controls for generating the drawing 140. In some embodiments, the toolbar area 940 can include a grid control for toggling display of a grid in the drawing canvas area 910 and/or the guidance image area 920. In some embodiments, the guidance image displayed in the guidance image area 920 and the drawing canvas area 910 include a grid (e.g., three by three grid). For example, us of the grid can reduce cognitive load by allowing for the user drawing to only focus on a particular piece of the grid at a time. This can allow the user to produce drawings 140 that are more accurate and/or have proper proportions.

In some embodiments, the toolbar area 940 can include a control for adjusting a display intensity (e.g., slider control) of a guidance image underlay within the drawing canvas area 910. In some embodiments, the toolbar area 940 can include a control which allows the user to undo stroke(s). In some embodiments, the toolbar area 940 includes a control for stroke width and/or stroke color. In some embodiments, the system 100 can dynamically change stroke width and/or darkness with pressure and tilt.

Figure 12:
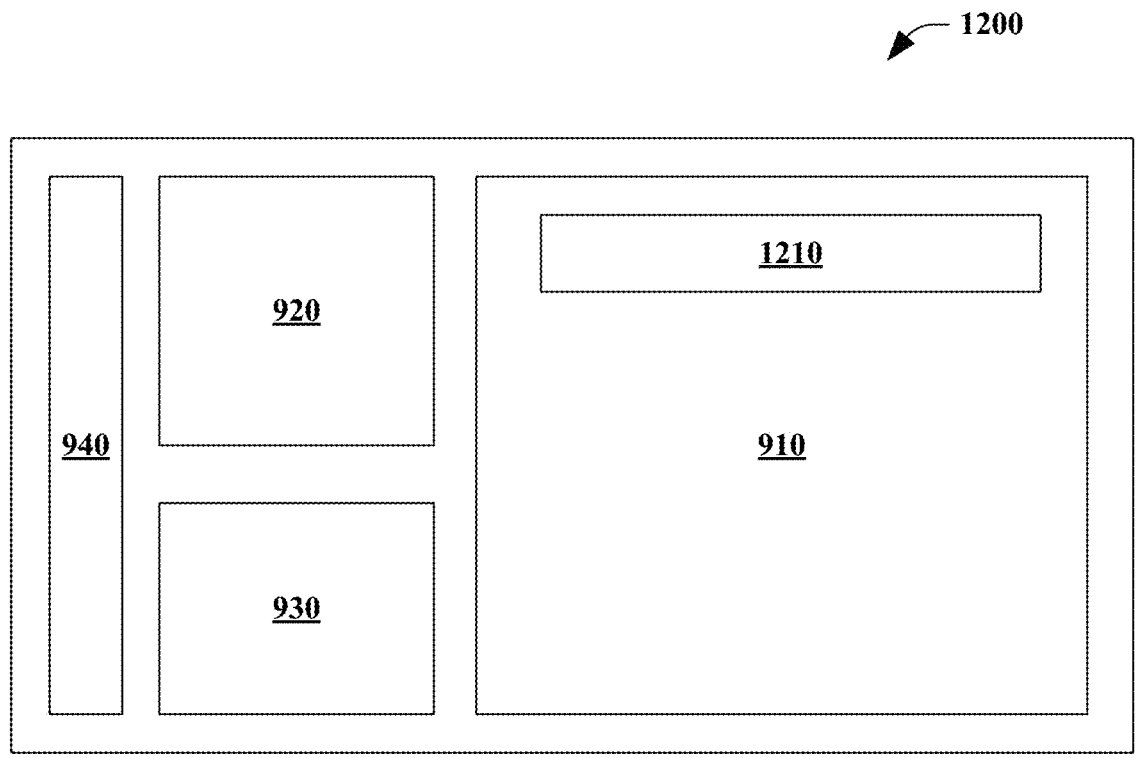

Referring briefly to FIG. 12, an exemplary user interface 1200 is illustrated. The user interface 1200 can be provided by the system 100. The user interface 1200 can include a user feedback display area 1210. For example, one or more feedback graphical image(s) and/or feedback text message(s) can be displayed to the user in response to received user input in the drawing canvas area 910. In some embodiments, the user feedback display area 1210 can provide intelligent real-time feedback on pressure, tilt, and/or grip suggestion(s).

In some embodiments, styluses can provide information regarding detected pressure and/or tilt. This information can be utilized by the system 100 to provide feedback to the user.

In some embodiments, the pressure data used by the user feedback component 180 is raw and in the range of no pressure to the highest detectable pressure associated with a particular stylus. The "tilt" can be an altitude value computed from tiltX and tiltY raw values provided by the stylus, which represent the angle of the stylus in relation to the display in the X and Y planes, respectively. This computed altitude value can be the angle of the stylus in relation to the screen regardless of its orientation in the X and Y planes. For purposes of explanation, the computed altitude value can be referred to herein as "tilt".

The user feedback component 180 can provide appropriate feedback to the user depending on the user's performance and the step the user is on. For example, in an initial linework step, low pressure is encouraged so that the linework is light and not overpowering the drawing. In the shading steps, varying levels of pressure are encouraged for the light, medium, and dark values. Additionally, low tilt is encouraged for a more realistic shading effect.

In some embodiments, a range of threshold to trigger feedback to the user can be determined through iterative testing and/or feedback from users and/or domain experts. The range can be generous to allow for enough flexibility so as to be useful to the user, but not constantly disruptive.

Figure 13:
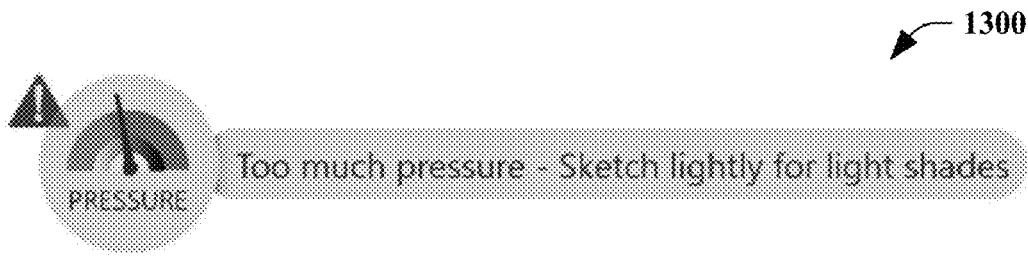
Figure 14:
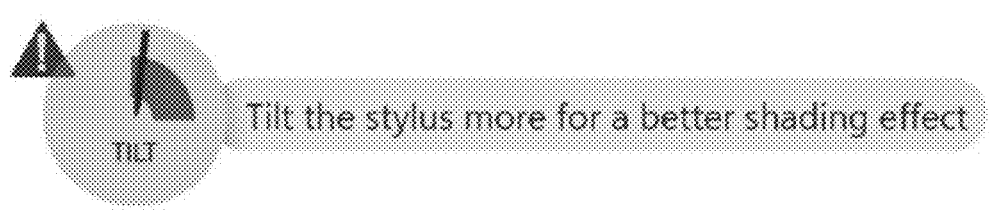
Figure 15:
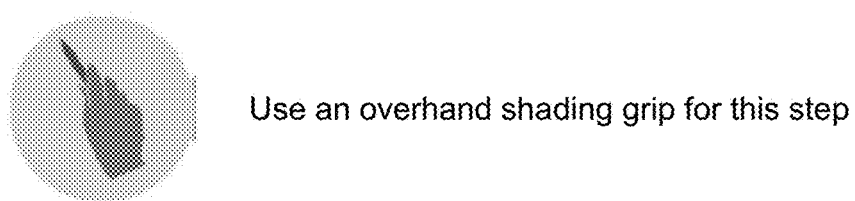

Turning briefly to FIGS. 13-15 exemplary user interfaces 1300, 1400, 1500 that can be displayed in the user feedback display area 1210 are illustrated. In some embodiments, pressure and/or tilt feedback can be continuously visible. In some embodiments, pressure and/or tilt feedback is provided only the user is performing outside of a predefined range, with the feedback fading out as the causal condition is corrected. In this way, the user can notice the feedback, adjust accordingly, and then resume drawing.

Referring initially to FIG. 13, user interface 1300 can be provided in response to a determination by the user feedback component 180 that the user is applying too much pressure for the particular step. In addition to identifying the condition which caused the user interface 1300 to be displayed, the user interface can further provide guidance for correcting the condition, for example, "sketch lightly for light shades". In some embodiments, the user interface 1300 further includes a graphic image (e.g., color-coded pressure gauge) to visually provide relative feedback information to allow the user to determine an amount of corrective action required (e.g., slight, severe). In some embodiments, in addition to the graphic image and/or textual information, a particular stroke that was poorly executed can temporarily change colors (e.g., turn to red), provoking the user to be aware of which stroke caused the condition to be triggered and allow the user to erase the stroke, if the user choose to do so. Similarly, user interface(s) can be provided in response to a determination by the user feedback component 180 that the user is applying too little pressure for the particular step.

Turning to FIG. 14, user interface 1400 can be provided in response to a determination by the user feedback component 180 that the user is applying too little tilt for the particular step. In addition to identifying the condition which caused the user interface 1400 to be displayed, the user interface can further provide guidance for correcting the condition, for example, "tilt the stylus more for a better shading effect". In some embodiments, the user interface 1400 further includes a graphic image (e.g., color-coded scale) to visually provide relative feedback information to allow the user to determine an amount of corrective action required. In some embodiments, in addition to the graphic image and/or textual information, a particular stroke that was poorly executed can temporarily change colors (e.g., turn to red), provoking the user to be aware of which stroke caused the condition to be triggered and allow the user to erase the stroke, if the user choose to do so. Similarly, user interface(s) can be provided in response to a determination by the user feedback component 180 that the user is applying too much tilt for the particular step.

Referring next to FIG. 15, user interface 1500 can be provided in response to a determination by the user feedback component 180 that grip information may be helpful to the user, for example, in the shading steps. The user interface can provide guidance for performing a particular step, for example, "use an overhand shading grip for this step." For example, grip information can be important for the shading steps as it can be easier to tilt the stylus properly with an overhand grip, and this grip is often used by professional artists when they are shading.

Figure 16:
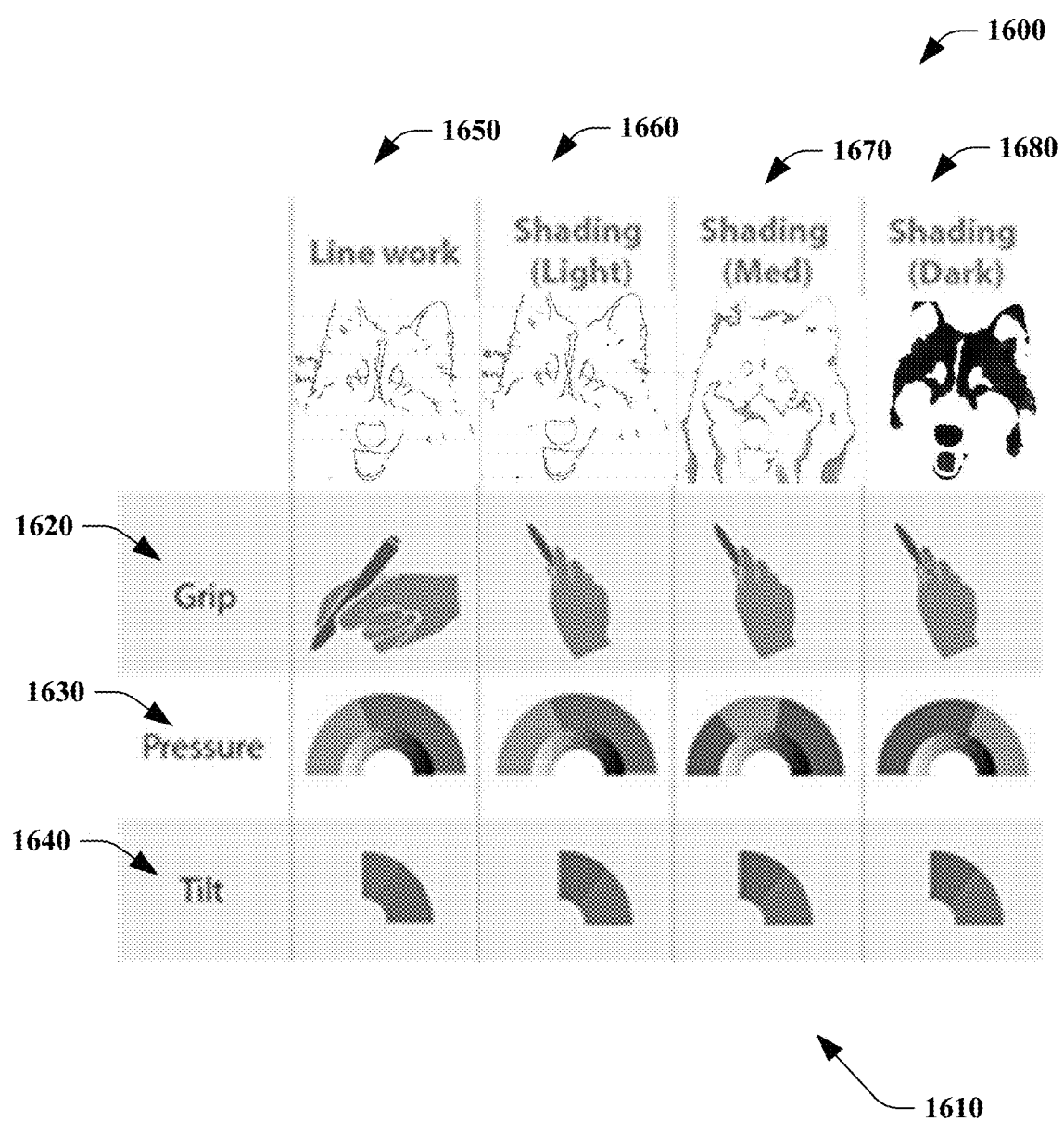
FIG. 16 is a diagram that illustrates a table of exemplary feedback symbols.

For purposes of explanation and not limitation, FIG. 16 is a table 1600 illustrating exemplary feedback symbols 1610. The table includes feedback symbols 1610 based upon grip 1620, pressure 1630, and tilt 1640 during a linework step 1650, a shading (light) step 1660, a shading (medium) step 1670, and a shading (dark) step 1680.

In summary, the system 100 provides a technique for converting a digital image (e.g., photo) into a set of steps that interactively guide a user in drawing the digital image. In some embodiments, the system 100 can be a progressive web application built primarily in JavaScript and utilizing Windows® Ink application programming interface (API), utilizing Python for the image processing component 110.

Figure 17:
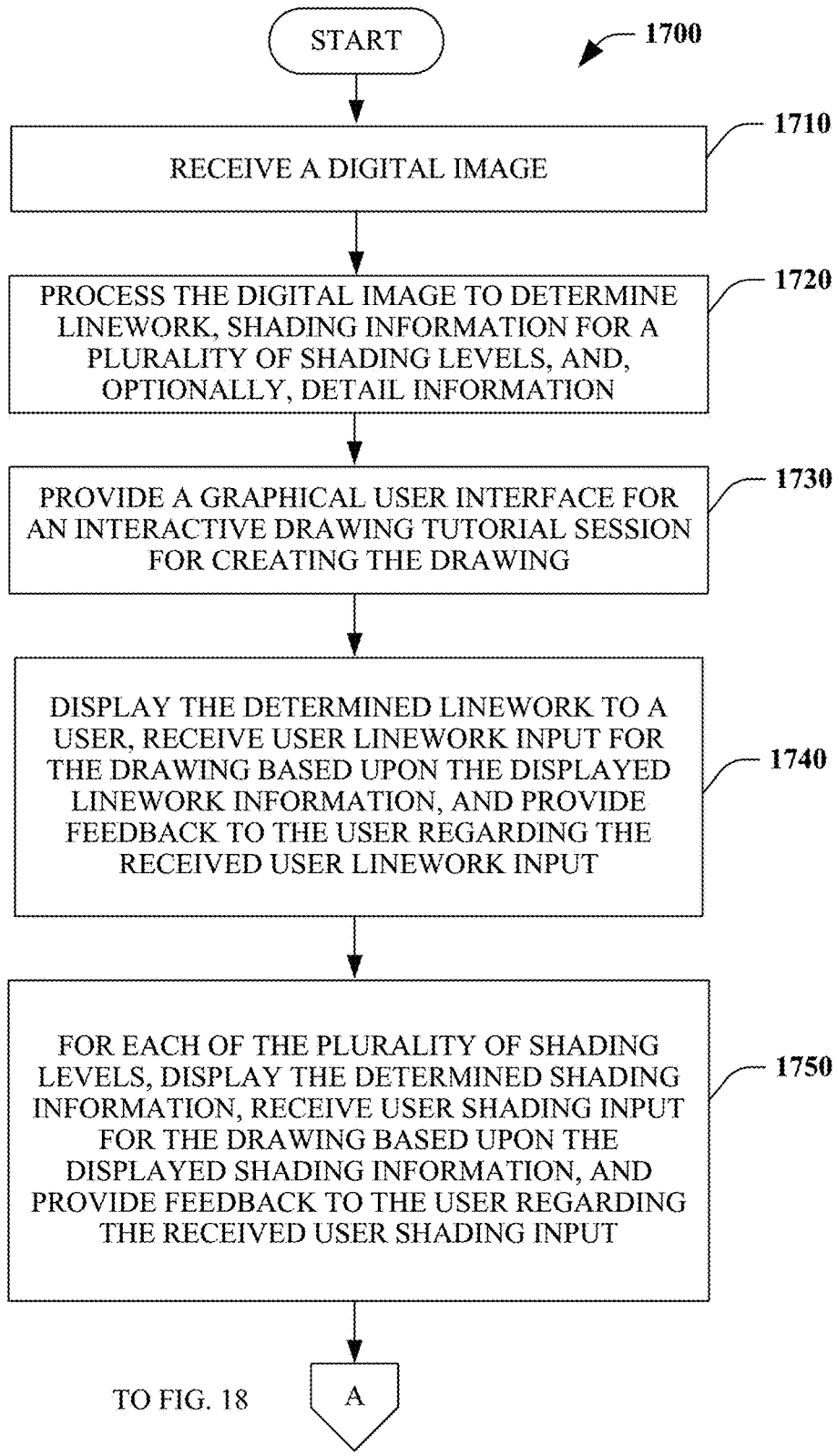
FIGS. 17 and 18 are flow charts that illustrate a method for creating a drawing.
Figure 18:
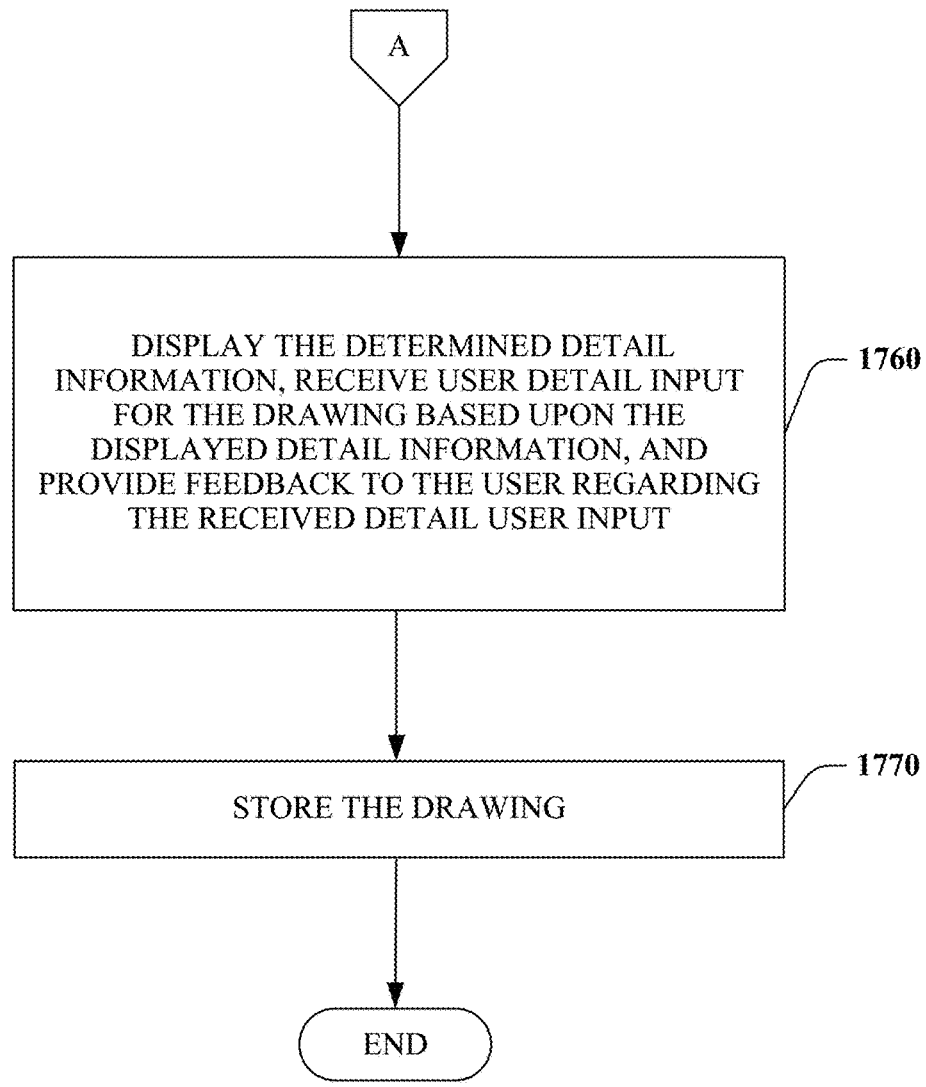

FIGS. 17 and 18 illustrate an exemplary methodology for creating a drawing. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIGS. 17 and 18, a method of creating a drawing 1700 is illustrated. In some embodiments, the method 1700 is performed by the system 100.

At 1710, a digital image is received. At 1720, the digital image is processed to determine linework and shading information for a plurality of shading levels. In some embodiments, the digital image is further processed to determine detail information.

At 1730, a graphical user interface is provided for an interactive drawing tutorial session for creating the drawing. At 1740, the determined linework is displayed to a user. User linework input is received for the drawing based upon the displayed linework information. Feedback is provided to the user regarding the received user linework input.

At 1750, for each of the plurality of shading levels, the determined shading information is displayed. User shading input for the drawing is received based upon the displayed shading information. Feedback is provided to the user regarding the received user shading input.

At 1760, optionally, the determined detail information is displayed. User detail input for the drawing is received based upon the displayed detail information. In some embodiments, feedback is provided to the user regarding the received detail user input. At 1770, the drawing is stored.

Described herein is a system for creating a drawing, comprising: a computer comprising a processor and a memory having computer-executable instructions stored thereupon which, when executed by the processor, cause the computer to: receive a digital image; process the digital image to determine linework and shading information for a plurality of shading levels; provide a graphical user interface for an interactive drawing tutorial session for creating the drawing, comprising: display the determined linework to a user, receive user linework input for the drawing based upon the displayed linework information, and provide feedback to the user regarding the received user linework input; for each of the plurality of shading levels, display the determined shading information to the user, receive user shading input for the drawing based upon the displayed shading information, and provide feedback to the user regarding the received user shading input; and, store the drawing.

The system can further include wherein process the digital image further comprises processing the digital image to determine detail information, and, wherein provide the graphical user interface for the interactive drawing tutorial session further comprises display the determined detail information, receive user detail input for the drawing based upon the displayed detail information, and provide feedback to the user regarding the received detail user input. The system can further include wherein process the digital image to determine linework and shading information for a plurality of shading levels comprises: convert the digital image to grayscale; and, apply a saturation effect to the converted digital image. The system can further include wherein the linework is determined using an edge detection algorithm.

The system can further include wherein the shading information for the plurality of shading levels is determined using a k-means clustering algorithm in accordance with a quantity of shading levels. The system can further include wherein the determined linework is displayed to the user in an area of the graphical user interface separate from an area of the graphical user interface for receiving user input for the drawing. The system can further include wherein the determined linework is simultaneously displayed to the user in at least a portion of a same area of the graphical user interface as an area for receiving user input for the drawing.

The system can further include wherein the determined shading information is displayed to the user in an area of the graphical user interface separate from an area of the graphical user interface for receiving user input for the drawing. The system can further include wherein the determined shading information is displayed to the user in a same area of the graphical user interface as an area for receiving user input for the drawing. The system can further include wherein at least one of the feedback to the user regarding the received user linework input or the feedback to the user regarding the received user shading input comprises information regarding tilt of an electronic stylus used by the user.

The system can further include wherein at least one of the feedback to the user regarding the received user linework input or the feedback to the user regarding the received user shading input comprises information regarding pressure associated with an electronic stylus used by the user. The system can further include wherein at least one of the feedback to the user regarding the received user linework input or the feedback to the user regarding the received user shading input is provided only when the system determines that use of an electronic stylus is regarding at least one of tilt or pressure is outside of a predetermined range.

Described herein is a method of creating a drawing, comprising: receiving a digital image; processing the digital image to determine linework and shading information for a plurality of shading levels; providing a graphical user interface for an interactive drawing tutorial session for creating the drawing, comprising: displaying the determined linework to a user, receiving user linework input for the drawing based upon the displayed linework information, and providing feedback to the user regarding the received user linework input; for each of the plurality of shading levels, displaying the determined shading information to the user, receiving user shading input for the drawing based upon the displayed shading information, and providing feedback to the user regarding the received user shading input; and, storing the drawing.

The method can further include wherein processing the digital image to determine linework and shading information for a plurality of shading levels comprises: converting the digital image to grayscale; and applying a saturation effect to the converted digital image. The method can further include wherein the linework is determined using an edge detection algorithm. The method can further include wherein the shading information for the plurality of shading levels is determined using a k-means clustering algorithm in accordance with a quantity of shading levels.

The method can further include wherein at least one of the feedback to the user regarding the received user linework input or the feedback to the user regarding the received user shading input comprises information regarding tilt of an electronic stylus used by the user. The method can further include wherein at least one of the feedback to the user regarding the received user linework input or the feedback to the user regarding the received user shading input comprises information regarding pressure associated with an electronic stylus used by the user.

Described herein is a computer storage media storing computer-readable instructions that when executed cause a computing device to: receive a digital image; process the digital image to determine linework and shading information for a plurality of shading levels; provide a graphical user interface for an interactive drawing tutorial session for creating the drawing, comprising: display the determined linework to a user, receive user linework input for the drawing based upon the displayed linework information, and provide feedback to the user regarding the received user linework input; for each of the plurality of shading levels, display the determined shading information to the user, receive user shading input for the drawing based upon the displayed shading information, and provide feedback to the user regarding the received user shading input; and, store the drawing.

The computer storage medium can further include wherein at least one of the feedback to the user regarding the received user linework input or the feedback to the user regarding the received user shading input comprises information regarding at least one of tilt or applied pressure of an electronic stylus used by the user.

Figure 19:
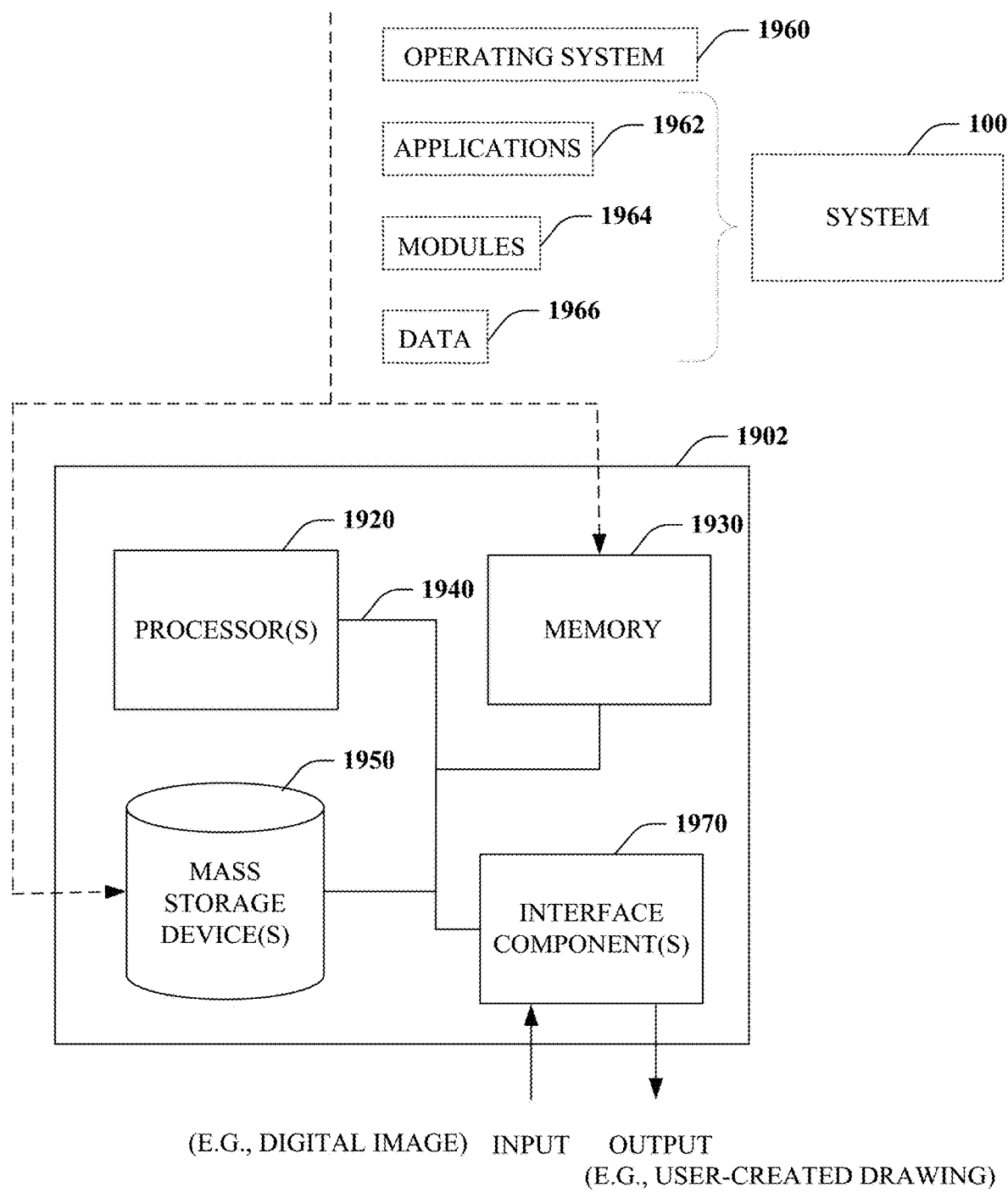
FIG. 19 is a functional block diagram that illustrates an exemplary computing system.

With reference to FIG. 19, illustrated is an example general-purpose computer or computing device 1902 (e.g., mobile phone, desktop, laptop, tablet, watch, server, handheld, programmable consumer or industrial electronics, set-top box, game system, compute node, etc.). For instance, the computing device 1902 may be used in a system for creating a drawing 100.

The computer 1902 includes one or more processor(s) 1920, memory 1930, system bus 1940, mass storage device(s) 1950, and one or more interface components 1970. The system bus 1940 communicatively couples at least the above system constituents. However, it is to be appreciated that in its simplest form the computer 1902 can include one or more processors 1920 coupled to memory 1930 that execute various computer executable actions, instructions, and or components stored in memory 1930. The instructions may be, for instance, instructions for implementing functionality described as being carried out by one or more components discussed above or instructions for implementing one or more of the methods described above.

The processor(s) 1920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1920 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1920 can be a graphics processor.

The computer 1902 can include or otherwise interact with a variety of computer-readable media to facilitate control of the computer 1902 to implement one or more aspects of the claimed subject matter. The computer-readable media can be any available media that can be accessed by the computer 1902 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 1902. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1930 and mass storage device(s) 1950 are examples of computer-readable storage media. Depending on the exact configuration and type of computing device, memory 1930 may be volatile (e.g., RAM), non-volatile (e.g., ROM, flash memory, etc.) or some combination of the two. By way of example, the basic input/output system (BIOS), including basic routines to transfer information between elements within the computer 1902, such as during start-up, can be stored in nonvolatile memory, while volatile memory can act as external cache memory to facilitate processing by the processor(s) 1920, among other things.

Mass storage device(s) 1950 includes removable/non-removable, volatile/non-volatile computer storage media for storage of large amounts of data relative to the memory 1930. For example, mass storage device(s) 1950 includes, but is not limited to, one or more devices such as a magnetic or optical disk drive, floppy disk drive, flash memory, solid-state drive, or memory stick.

Memory 1930 and mass storage device(s) 1950 can include, or have stored therein, operating system 1960, one or more applications 1962, one or more program modules 1964, and data 1966. The operating system 1960 acts to control and allocate resources of the computer 1902. Applications 1962 include one or both of system and application software and can exploit management of resources by the operating system 1960 through program modules 1964 and data 1966 stored in memory 1930 and/or mass storage device (s) 1950 to perform one or more actions. Accordingly, applications 1962 can turn a general-purpose computer 1902 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 1962, and include one or more modules 1964 and data 1966 stored in memory and/or mass storage device(s) 1950 whose functionality can be realized when executed by one or more processor(s) 1920.

In accordance with one particular embodiment, the processor(s) 1920 can correspond to a system on a chip (SOC) or like architecture including, or in other words integrating, both hardware and software on a single integrated circuit substrate. Here, the processor(s) 1920 can include one or more processors as well as memory at least similar to processor(s) 1920 and memory 1930, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 1902 also includes one or more interface components 1970 that are communicatively coupled to the system bus 1940 and facilitate interaction with the computer 1902. By way of example, the interface component 1970 can be a port (e.g., serial, parallel, PCMCIA, USB, FireWire, etc.) or an interface card (e.g., sound, video, etc.) or the like. In one example implementation, the interface component 1970 can be embodied as a user input/output interface to enable a user to enter commands and information into the computer 1902, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 1970 can be embodied as an output peripheral interface to supply output to displays (e.g., LCD, LED, plasma, etc.), speakers, printers, and/or other computers, among other things. Still further yet, the interface component 1970 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for creating a drawing, the system comprising:
   a computer comprising a processor and a memory having computer-executable instructions stored thereupon which, when executed by the processor, cause the computer to:
   receive a digital image;
   process the digital image to determine linework and shading information for a plurality of shading levels;
   provide a graphical user interface for an interactive drawing tutorial session for creating the drawing, the graphical user interface comprising a canvas area and a guidance image area;
   display the determined linework in the guidance image area of the graphical user interface;
   receive user linework input for the drawing in the canvas area of the graphical user interface;
   provide linework feedback regarding the received user linework input;
   display the determined shading information in the guidance image area;
   receive user shading input for the drawing in the canvas area;
   provide shading feedback regarding the received user shading input; and
   store the drawing.

2. The system of claim 1, wherein the computer-executable instructions, when executed by the processor, cause the computer to:
   process the digital image to determine detail information;
   display the determined detail information in the guidance image area;
   receive user detail input for the drawing in the canvas area; and
   provide detail feedback to the user regarding the received user detail input.

3. The system of claim 1, wherein the computer-executable instructions, when executed by the processor, cause the computer to:
   process the digital image to determine the linework and the shading information by:
     converting the digital image to a grayscale image; and
     apply a saturation effect to the grayscale image.

4. The system of claim 1, wherein the computer-executable instructions, when executed by the processor, cause the computer to:
   determine the linework is determined using an edge detection algorithm.

5. The system of claim 1, wherein the computer-executable instructions, when executed by the processor, cause the computer to:
   determine the shading information for the plurality of shading levels using a k-means clustering algorithm.

6. The system of claim 1, wherein the guidance image area is separate from the canvas area.

7. The system of claim 6, wherein the canvas area is larger than the guidance image area.

8. The system of claim 1, wherein the determined shading information comprises at least three different darkness levels.

9. The system of claim 8, wherein the computer-executable instructions, when executed by the processor, cause the computer to:
   display at least three different shading guidance images, corresponding to the at least three different darkness levels, in the guidance image area.

10. The system of claim 1, wherein at least one of the linework feedback or the shading feedback comprises information regarding tilt of an electronic stylus used to create the drawing in the canvas area.

11. The system of claim 1, wherein at least one of the linework feedback or the shading feedback comprises information regarding pressure associated with an electronic stylus used to create the drawing in the canvas area.

12. The system of claim 1, wherein the computer-executable instructions, when executed by the processor, cause the computer to:
   provide at least one of the linework feedback or the shading feedback responsive to detecting that at least one of tilt or pressure of an electronic stylus applied to the canvas area is outside of a predetermined range.

13. A computer-implemented method, comprising:
   receiving a digital image;
   processing the digital image to determine linework and shading information for a plurality of shading levels;
   providing a graphical user interface for an interactive drawing tutorial session for creating a drawing, the graphical user interface comprising a canvas area and a guidance image area;
   displaying the determined linework, in the guidance image area of the graphical user interface;
   receiving user linework input in the canvas area of the graphical user interface;
   providing linework feedback regarding the received user linework input;
   displaying the determined shading information in the guidance image area;
   receiving user shading input in the canvas area;
   providing shading feedback regarding the received user shading input; and
   storing the drawing, the drawing being based at least on the user linework input and the user shading input.

14. The method of claim 13, wherein processing the digital image to determine the linework and the shading information comprises:
   converting the digital image to a grayscale image; and
   applying a saturation effect to the grayscale image.

15. The method of claim 13, further comprising:
   determining the linework using an edge detection algorithm.

16. The method of claim 13, further comprising:
   determining the shading information for at least three different darkness levels using a clustering algorithm.

17. The method of claim 13, further comprising:
   determining a recommended tilt of an electronic stylus that provides the user shading input; and
   including the recommended tilt in the shading feedback.

18. The method of claim 13, further comprising:
   determining a recommended pressure associated with an electronic stylus that provides the user shading input; and
   including the recommended pressure in the shading feedback.

19. A computer storage medium storing computer-readable instructions that, when executed, cause a computing device to:

receive a digital image;

process the digital image to determine linework, first shading information for a first darkness level, and second shading information for a second darkness level;

provide a graphical user interface for an interactive drawing tutorial session for creating a drawing, the graphical user interface comprising a canvas area and a guidance image area;

display the determined linework in the guidance image area of the graphical user interface;

receive user linework input in the canvas area of the graphical user interface;

provide linework feedback to the user regarding the received user linework input;

display the first shading information for the first darkness level and the second shading information for the second darkness level in the guidance image area;

receive first user shading input in the canvas area while the first shading information is displayed in the guidance image area and second user shading input while the second shading information is displayed in the guidance image area;

provide shading feedback regarding at least one of the first user shading input or the second user shading input; and store the drawing, the drawing reflecting the user linework input, the first user shading input, and the second user shading input.

20. The computer storage medium of claim 19, wherein at least one of the linework feedback or the shading feedback comprises information regarding at least one of tilt or applied pressure of an electronic stylus used to create the drawing.

* * * * *